United States Patent [19]
Bateman et al.

[11] Patent Number: 5,430,299
[45] Date of Patent: Jul. 4, 1995

[54] SCINTILLATION CRYSTAL RADIATION DETECTOR WHICH USES A MULTIWIRE COUNTER STRUCTURE IN A POSITION SENSITIVE PHOTO-MULTIPLIER

[75] Inventors: James E. Bateman, Appleton; Richard Stephenson, Wallingford, both of England

[73] Assignee: British Technology Group Ltd., London, England

[21] Appl. No.: 211,678

[22] PCT Filed: Oct. 22, 1992

[86] PCT No.: PCT/GB92/01941
§ 371 Date: Apr. 12, 1994
§ 102(e) Date: Apr. 12, 1994

[87] PCT Pub. No.: WO93/08484
PCT Pub. Date: Apr. 29, 1993

[30] Foreign Application Priority Data
Oct. 22, 1991 [GB] United Kingdom ............... 9122348

[51] Int. Cl.6 ..................... G01T 1/202; G01T 1/185
[52] U.S. Cl. .................... 250/374; 250/361 R; 250/385.1
[58] Field of Search ............... 250/385.1, 374, 361 R

[56] References Cited
U.S. PATENT DOCUMENTS
4,429,228 1/1984 Anderson ..................... 250/374

FOREIGN PATENT DOCUMENTS
2039140 7/1980 United Kingdom .

OTHER PUBLICATIONS
Nuclear Instruments & Methods In Physucs Research, vol. 225, No. 1 Aug. 1984, Amsterdam NL, pp. 8-12, D. F. Anderson et al "Recent Developments in BaF2 scintillator coupled to a low-pressure wire chamber".
IEEE Transaction On Nuclear Science, vol. 32, No. 1 Feb. 1985, New York US, pp. 663-667, F. Sauli et al "Ultraviolet photon detection in TMAE using a multi-step proportional chamber".

Primary Examiner—Carolyn E. Fields
Attorney, Agent, or Firm—Cushman, Darby & Cushman

[57] ABSTRACT

A PET radiation detector includes a pair of amplifying gaps 3,21 to enhance the electron yield from a TMAE gas, BaF2 gamma detector, together with a gate electrode 17 to inhibit passage of charge to the detector electrodes and reverse passage of ions to the crystal. A further reverse-biased gap may be positioned adjacent the crystal to prevent charge build-up thereon. Shield electrodes 23,25 prevent gate switching signals causing spurious responses in the detector circuit.

9 Claims, 3 Drawing Sheets

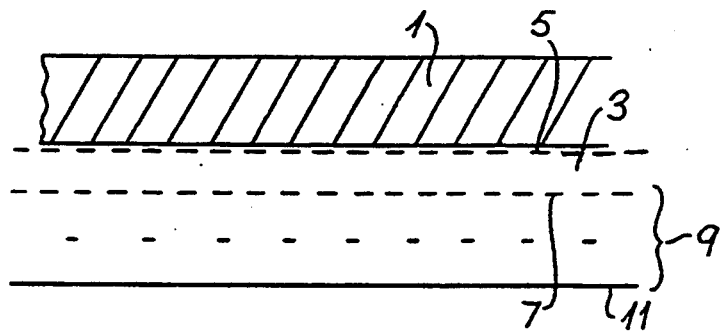
PRIOR ART Fig. 1
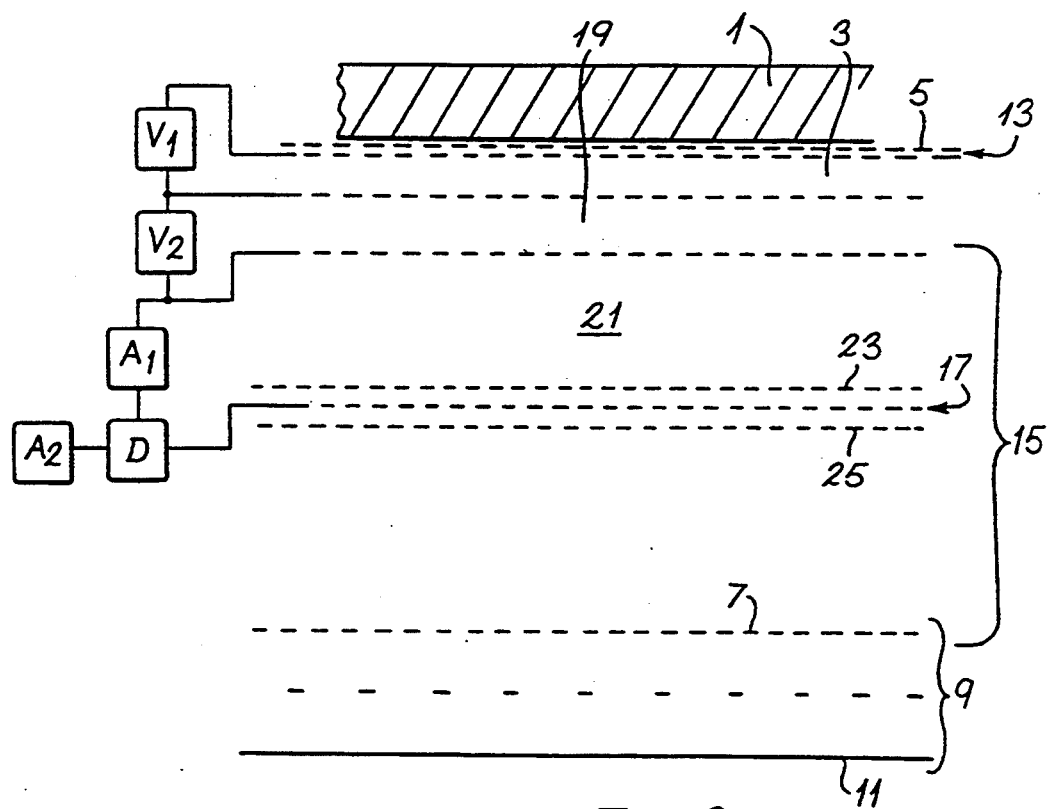
Fig. 2

SCINTILLATION CRYSTAL RADIATION DETECTOR WHICH USES A MULTIWIRE COUNTER STRUCTURE IN A POSITION SENSITIVE PHOTO-MULTIPLIER

BACKGROUND OF THE INVENTION

This invention relates to detectors and, in particular, to detectors fog gamma radiation.

1. FIELD OF THE INVENTION
2. DESCRIPTION OF RELATED ART

Referring now to the drawings, FIG. 1 shows a prior art design. Incident gamma radiation causes a $BaF_2$ crystal 1 to scintillate, generating ultra-violet (uv) photons. The UV photons convert in a gas space 3 adjacent to the crystal and the resulting handful of electrons are amplified in a high electric field applied between a conductive mesh 5 on the crystal surface and the cathode 7 of a multiwire proportional counter (MWPC) 9. The signal is transferred into this section and further amplified on the anode wires 11. Some form of read-out is built into the MWPC section.

We found that this structure was very unstable and started to breakdown after 20 minutes or so, due to the charging of the crystal surface by the positive, ions returning from the avalanche in the MWPC. However, we attempted to address this instability by installing a protective gap 13 (FIG. 2) with a reverse bias immediately against the crystal face. This gap (preferably 0.5-1.0 mm wide) sacrifices a little signal for a very much enhanced stability. He have found that with 100 V of reverse bias the modified counter will run all day without showing charging effects.

In the prior art positron camera a severe practical problem is caused by the very high ratio of single counts to coincidence (i.e. useful) counts (up to $\approx 50:1$). This overloads the gain elements of the MWPC and causes serious deadtime losses in the read-out system. He found two further modifications which improve this situation significantly. Firstly, the initial parallel amplifying gap 3 which now follows the crystal barrier gap is separated from the MWPC by a wide gap 19 ($\sim 30$ mm). (This on its own further enhances the stability of the counter.) In order to do our fast coincidence we would now like to take a trigger signal from the back of this gap. However, as this would demand too much gain from one gap we insert a further gap 21 and take the trigger signal from its rear face.

Secondly the fast coincidence with the other detector is performed while the electron cloud drifts towards a MWPC 9 which delivers a final burst of gain and performs the read-out. Roughly in the middle of the drift region 15 is an electronic gate 17 operated by the coincidence circuit. This ensures that only "good" events trigger the MWPC and the read-out system. This simultaneously enhances the stability of the counter and dramatically reduces the pile-up in the read-out electronics. This gate has been carefully designed with shield electrodes 23,25 to minimise the interference it can cause in the read-out electronics.

With these modifications our tests to date have been able to demonstrate a quantum efficiency of 20% and a spatial resolution of 6 mm fwhm with a time resolution of 4 ns fwhm. The efficiency is three times that of the lead system and the time resolution $\frac{1}{3}$. This means a factor of 9 in sensitivity and a factor of 27 in signal to noise ratio. The predicted maximum data rate rise is from 2 kHz to 20 kHz under comparable conditions.

SUMMARY OF THE INVENTION

In our new radiation detector, 511 keV gamma rays are converted into UV photons which are then detected in TMAE vapour in a multiwire counter structure which functions as a position sensitive photomultiplier.

According to the present invention there is provided a radiation detector comprising a scintillation crystal, means to convert optical radiation into electrical charge carriers and detector means to detect the generated charge carriers wherein a gap provided with means to inhibit the passage of charge carriers is positioned between said crystal and said detector means.

BRIEF DESCRIPTION OF THE DRAWINGS

The invention will be particularly described, by way of example, with reference to the following accompanying drawings:

FIG. 1 shows a schematic section of a prior art positron camera;

FIG. 2 shows a schematic layout of a camera in accordance with a specific embodiment of the present invention;

DETAILED DESCRIPTION OF THE PREFERRED EMBODIMENT

Figure 3:
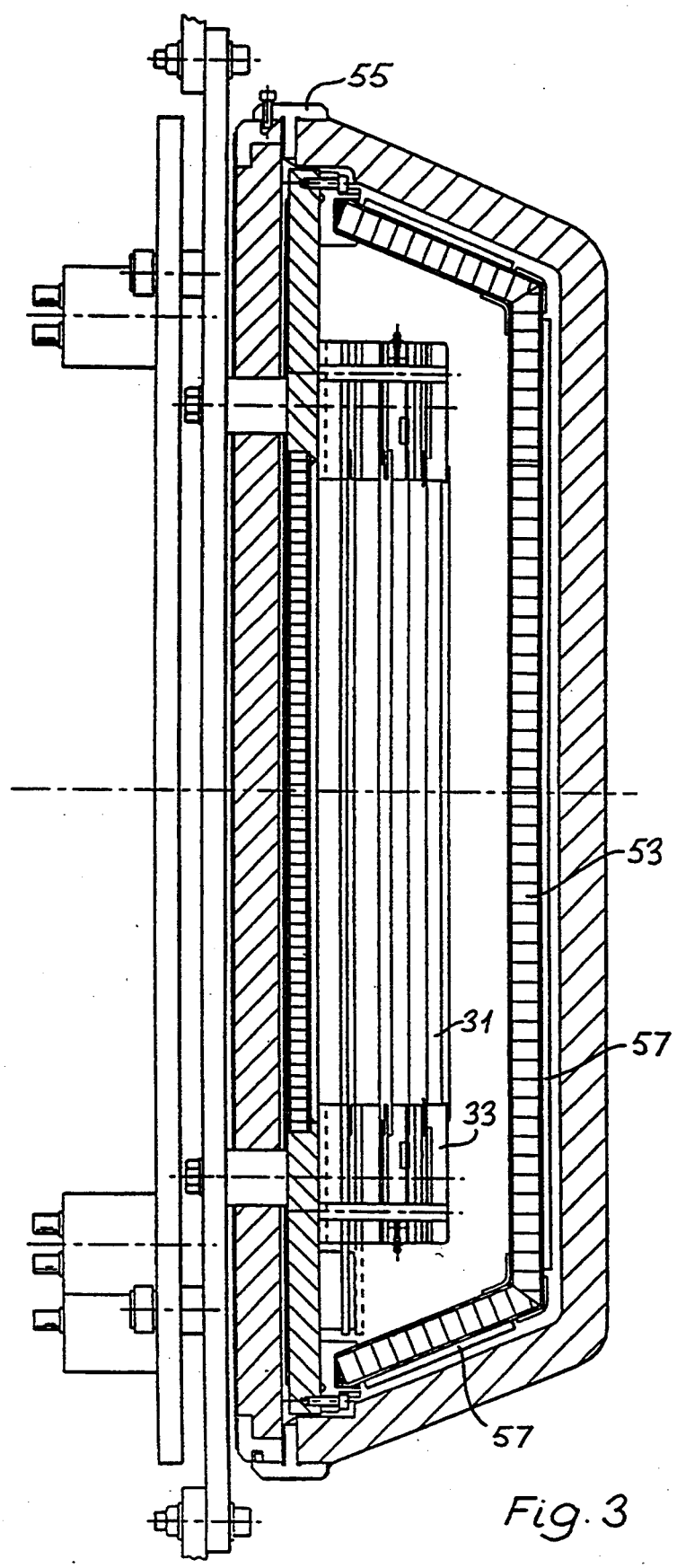
FIG. 3 is a section through a practical embodiment of the invention.
Figure 4:
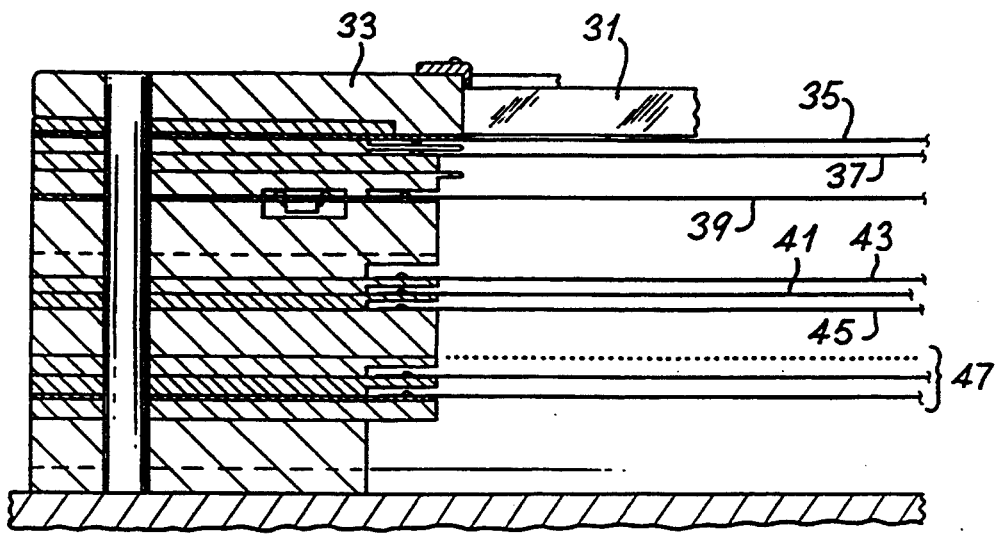
FIGS. 4 and 5 show details of the apparatus of FIG. 3.
Figure 5:
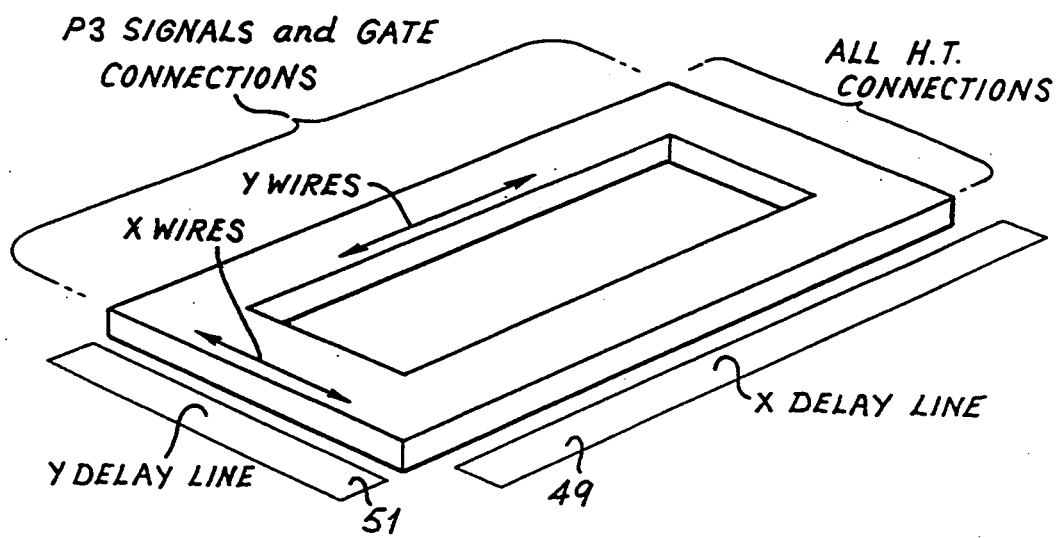

A practical embodiment of the detector is shown in FIG. 3. This comprises a barium fluoride crystal detector 31 comprising twelve tiles of $BaF_2$ mounted on a stainless steel frame 33. Next there is a series of wire planes. The first plane 35 consists of 50 $\mu m$ diameter wire at a pitch of 500$\mu m$ and is spaced 0.5 mm from the $BaF_2$ crystal. The second plane 37 consists of 100 $\mu m$ diameter wire at 1 mm pitch and is spaced 3.0 mm from the first plane. The third plane 39 also consists of 100 $\mu m$ diameter wire at 1 mm pitch and is spaced 9.0 mm from the second plane. A gate 41 comprising 100 $\mu m$ wires at 1 mm pitch is positioned 20.0 mm from the third wire plane and has first and second metallic mesh screens 43,45 positioned one on either side. Following a further gap of 13.2 mm, Is a back end detector 47 which looks like a conventional multi-wire proportional counter with orthogonal cathodes. The cathodes consist of 50 $\mu m$ wire at 2.0 mm pitch and the anode/cathode plane comprises 20 $\mu m$ anode wires and 100 $\mu m$ cathode wires at 4.0 mm pitch. X-and Y-coordinates are obtained with delay lines 49,51. The detector is mounted within a sealed enclosure comprising aluminium honeycomb-structure sheets 53 mounted on a stainless steel frame 55. Heater pads are provided to keep the enclosure at a constant temperature of 60° C. at which the TMAE vapour pressure is 4.5 mB. The honeycomb aluminium sheet Is structurally strong but is substantially transparent to the gamma photons.

In operation, a 511 KeV gamma photon is trapped by the $BaF_2$ crystal which emits a flash of 190 nm ultra-violet radiation. The UV radiation is absorbed by TMAE gas within the camera chamber and is photo-ionised creating electrons.

A voltage source V1 is connected between the first and second planes, creating a field of 300 V/mm which permits the creation of further electrons. A gain of a level generated by this field in a wider gap would be unstable, so a second amplification gap connected to a further voltage source V2 has a lower field strength of about 150 V/mm. The two gaps will together provide sufficent electrons for a detectable signal.

With a positron camera, there are two detectors, one on either side of the source. The positron emission event is characterised by coincidence of signals in the two detectors. A signal is therefore taken from the third plane and fed into an amplifier A1 and discriminator D. The signal from the corresponding amplifier A2 on the other detector is similarly extracted and examined for coincidence. When events are detected by both third, planes within a time window of 5 ns, the two events, one on each end are in time coincidence.

Between the third plane and the multi-wire detectors is placed a gate electrode which is normally biased ±20 V on alternate wires. It is a flat plane of wires, but with alternate wires connected to two bus bars so that if one wire is up, the next wire is down. As long as this voltage Is applied, the gate acts as a barrier to the passage of electrons between the third plane and the detectors. When coincidence occurs, the gate electrodes are brought to zero volts whilst the triggering electrons are still in process of passing through the drift field between the third plane and the gate. A window of about 200 ns Is available for this decision and action.

When the bias is removed from the gate wires, electrons can pass and will drift to the multi-wire and give rise to a normal avalanche around an anode wire, induce a signal on the cathode, thus permitting a readout of the X- and Y-coordinates.

The effect of the gating Is that the back end of the counter operates only at the coincidence rate whereas the front end generates electrons at a much higher rate corresponding to single events. This is an improvement of greater than 100:1, which has a corresponding effect on the signal/noise ratio of the detected signal. It also relieves congestion at the detector.

Another advantageous effect of the gate electrode is that it also acts as a barrier to the reverse transmission of positive ions from the multi-wire region.

Yet a further advantage of this arrangement is that the actual generation of positive Ions Is reduced since a large signal Is produced only after coincidence has opened the gate rather than continuously as with a conventional arrangement.

A problem with the fast switching of the gate electrode is that, with the level of signal and impedance of the multi-wire detector, spurious signals could be Induced In the detector circuit. To prevent this a copper mesh screen Is provided on either side of the gate, so the gate electrode. The screens are connected to potential sources appropriate to maintain the electron drift field. A metallic shield on the frame completely encloses the gate. AC continuity Is maintained by surface mount capacitors bridging connecting gaps, thereby creating a shielding cage round the gate electrode.

A further problem Is that of positive ions drifting back to the front end, since $BaF_2$ Is an almost perfect Insulator. This problem is addressed by two measures. Firstly a metallic wire is wound round the crystal. With 25 $\mu$m wire at 250 $\mu$m pitch there is still 90% spare area, but there is an electrode to trap the ions and also to reduce the length of the discharge track enormously.

Secondly, in the front of this crystal is provided a reverse blased gap 0.5 mm wide, so that the positive ions are not driven to the crystal. When they arrive at the first plane, 0.5 mm in front of the crystal, that Is the most negative point and they don't go any further. The disadvantage is that any UV light which is converted In the first 0.5 mm gap is effectively lost.

The thickness of the $BaF_2$ crystal may be Increased to improve sensitivity. This is, however, a trade-off against resolution with a practical maximum of 16 mm.

We claim:

1. A radiation detector comprising a scintillation crystal, means to convert optical radiation into electrical charge carriers and detector means to detect the generated charge carriers wherein a gap provided with means to inhibit the passage of charge carriers is positioned between said crystal and said detector means.

2. A radiation detector as claimed in claim 1 wherein said means to inhibit the passage of charge carriers comprises a grid immediately adjacent said scintillation crystal and a reverse bias applied to said grid.

3. A radiation detector as claimed in claim 2 wherein said grid is spaced 0.5 to 1.0 mm from said scintillation crystal.

4. A radiation detector as claimed in claim 3 wherein said bias is of the order of 100 V.

5. A radiation detector as claimed in claim 1 wherein it includes a succession of charge amplifying gaps across which different fields are applied.

6. A radiation detector as claimed in claim 5 wherein it includes a pair of charge amplifying gaps the first of which is of the order of 3 millimeters in width and the second of which is of the order of 9 millimeters in width.

7. A radiation detector as claimed in claim 6 wherein fields of the order of 300 V/mm and 150 V/mm are applied across respective said gaps.

8. A radiation detector as claimed in claim 1 wherein said means to inhibit the passage of charge carriers comprises a gate electrode placed intermediate said crystal and said detector means.

9. A method of detecting radiation comprising using a scintillation crystal to generate optical radiation, using said optical radiation to create an electrical charge by means of a photo-ionising medium, multiplying said charge in an electrical field, causing said multiplied charge to drift across a gap between field-creating electrodes, deriving a signal from said charge carriers and using said signal to control a gate electrode positioned In the drift path of said charge carriers.

* * * * *